United States Patent [19]

Hightower

[11] Patent Number: 4,533,013

[45] Date of Patent: Aug. 6, 1985

[54] MOTORIZED GOLF CART

[76] Inventor: James H. Hightower, 1338 Patuxent Dr., Olney, Md. 20861

[21] Appl. No.: 509,377

[22] Filed: Jun. 30, 1983

[51] Int. Cl.³ .............................................. B62D 61/08
[52] U.S. Cl. ............................. 180/210; 280/DIG. 5; 224/274; 248/96
[58] Field of Search ............... 180/210, 211, 212, 213, 180/214, 215, 216; 280/DIG. 5; 206/315.2, 315.3, 315.4, 315.5, 315.6, 315.7, 315.8; 224/274, 42.03 R, 42.03 A, 42.03 B; 248/96, 122, 95, 97, 98, 99, 124, DIG. 12; 211/71, 75, 13

[56] References Cited

U.S. PATENT DOCUMENTS 2,966,951  1/1961  Lang ..................................... 180/210
3,279,619  10/1966  Alissandratos ......................... 211/71
4,355,746  10/1982  Casady ................................. 224/274

Primary Examiner—Joseph F. Peters, Jr.
Assistant Examiner—Charles R. Watts
Attorney, Agent, or Firm—Cyr: Frank P.

[57] ABSTRACT

A motorized golf cart designed to have a seating capacity for only the driver thereof and is equipped at the rear portion with golf bag supporting brackets capable of securing four golf bags to the cart for transport of the golf bags.

1 Claim, 6 Drawing Figures

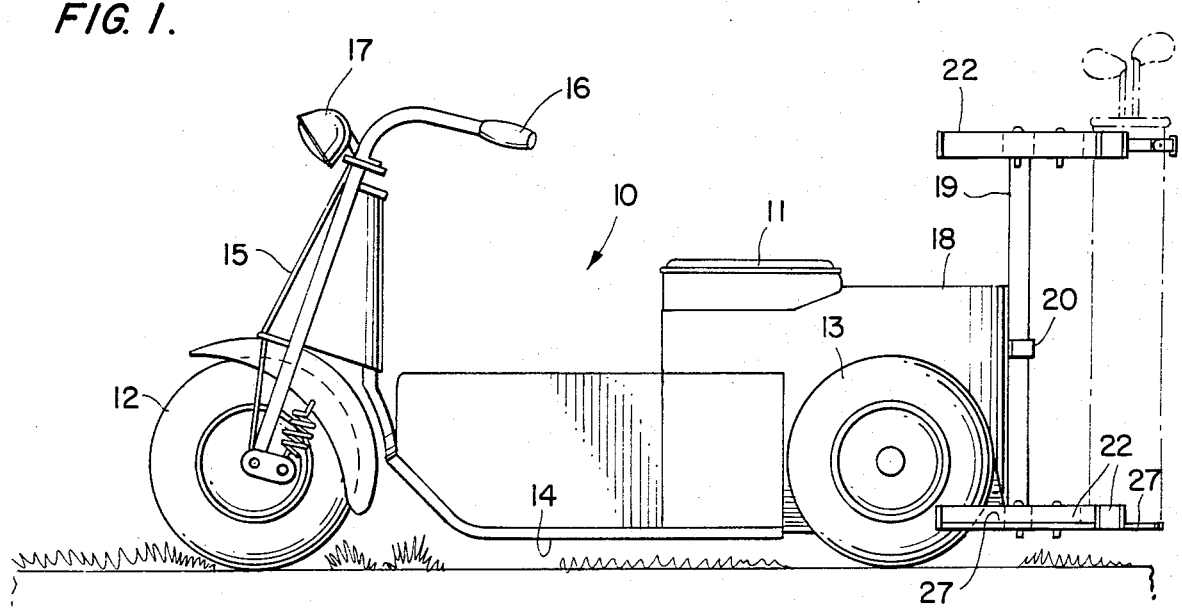
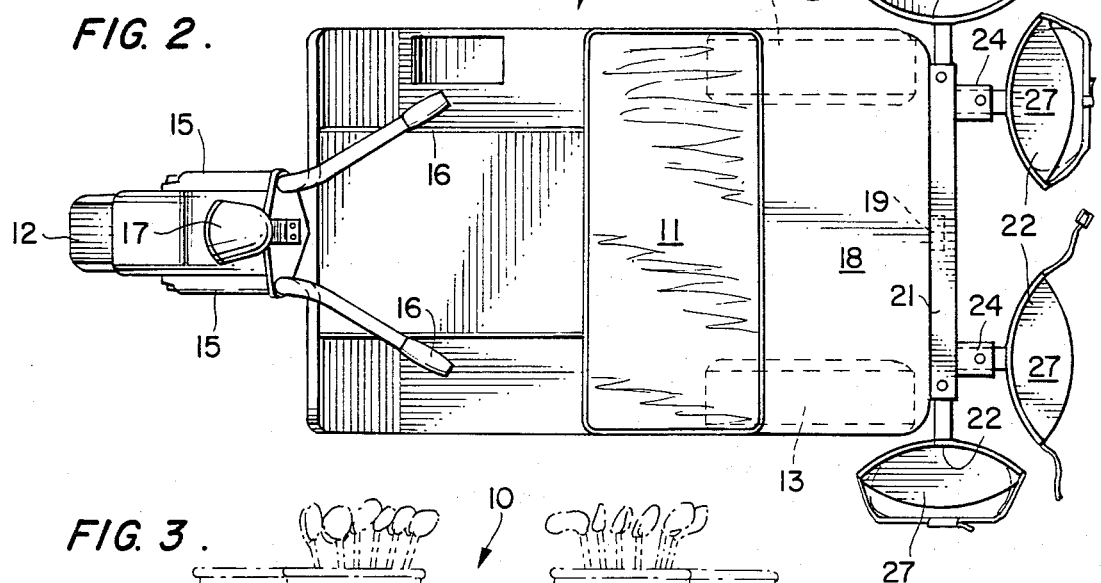
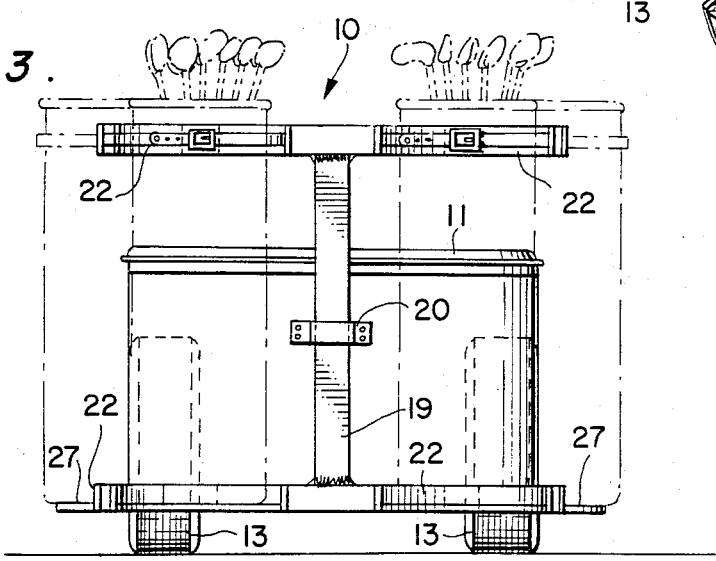

MOTORIZED GOLF CART

Motorized golf carts are in great demand by golfers for a number of reasons. Golf is a sport which can be enjoyed by people of advanced age since the use of a motorized golf cart enables an elderly person to enjoy a round of golf with little physical exertion.

To play a round of golf, the golfer must first decide if he is to walk the course carrying his own golf bag by means of the shoulder strap which extends along substantially the length of the bag, employ a pull cart on which the bag is placed, employ the services of a caddy, or rent a motorized golf cart available for rent from the golf professional or other rental facilities provided by the pro shop of the golf club.

Most motorized golf carts presently in use are equipped to seat two golfing riders and are also provided with a means whereby the golf bags of the riders are securely fastened to the carts. Thus it will be appreciated that the employment of a motorized golf cart permits one to play a round of golf without exerting undue physical exertion. This is particularly true when the golfer is of advanced age or due to some physical condition he has been instructed by his physician to refrain from walking the entire distance of the golf course. However, the employment of a motorized golf cart capable of carrying two riding golfers can present some problems. If a golfing foursome rents two motorized golf carts, no problems arise; but if one of the golfing foursome prefers to carry his own bag throughout the length of the course or if he prefers to employ a pull cart to carry his golf bag, then there remains one member of the foursome to rent a cart for his own use and such rental is at an increase in cost. Aside from economic reasons for not renting a motorized golf cart, numerous golfers prefer to walk the length of the course but detest the idea of having to carry their golf bags the length of the golf course.

With the above in mind, it is one of the objects of the invention to provide a motorized golf cart with a means whereby one rider can manipulate the cart throughout the length of the golf course and to simultaneously carry all of the golf bags of the golfing foursome.

Another object of the invention is to provide a single vertically extending standard which can be secured to the rear portion of a motorized golf cart and to which are secured a pair of laterally extending arms having means thereon whereby all of the golf bags of the golfing foursome may be carried by the motorized golf cart.

Another object of the invention is to provide a means whereby the golf bag supporting surfaces may be easily removed from the motorized golf cart when the cart is not used for supporting golf bags thereon.

Another object of the invention is to provide a single seating surface for the driver of the motorized golf cart thus enabling the remaining players in the foursome free to walk the length of the golf course or if preferred, the golfing foursome may alternate in the driving of the cart thus permitting the remainder of the golfing foursome to walk all or part of the length of the golf course.

Another object of the invention is to provide a three wheeled motorized golf cart with an undercarriage extending closely adjacent the ground which will prevent the tipping or overturning of the cart when the same is driven at an excessive speed around a sharp turn.

Other objects and features of the invention will become apparent as the description proceeds, especially when taken in conjunction with the accompanying drawings illustrating a preferred embodiment of the invention.

DESCRIPTION OF THE DRAWINGS

FIG. 1 is a side elevation of the motorized golf cart of the present invention.

FIG. 2 is a top plan view.

FIG. 3 is a view looking at the rear section of the motorized cart.

DESCRIPTION OF THE PREFERRED EMBODIMENT

Figures 4, 5, 6:
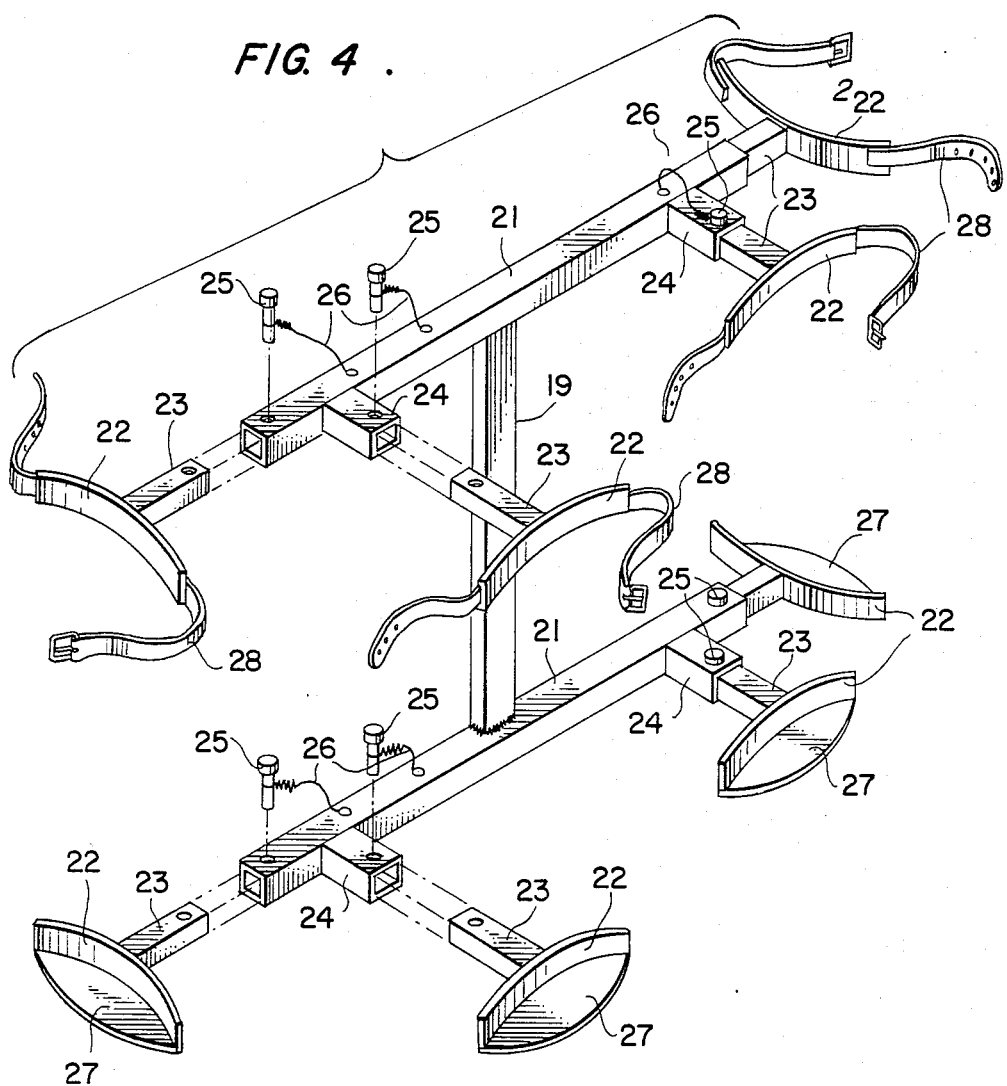
FIG. 4 is an enlarged exploded view showing the components for supporting four golf bags on the motorized golf cart.
FIG. 5 is a view taken from the front section of the cart.
FIG. 6 is a perspective view of the undercarriage of the present invention.

While the ensuing description will be directed particularly to a motorized golf cart adapted particularly for mounting four golf bags of a golfing foursome thereon, it will be understood such a motorized golf cart may be used for other purposes, such as affording a means to transport the user of the cart to a marketing area or to such other places as can be reached by the user of the cart where by local law such motorized golf cart may be used in areas other than golf courses.

Referring now to the drawings wherein like reference numerals are employed to designate like parts throughout the several views, reference numeral 10 designates in general a motorized golf cart constructed in accordance with the present invention. The cart includes a seating area 11 for the driver of the cart and includes a single ground engaging front wheel 12 and a pair of rear ground engaging wheels 13 journaled for rotation in any known manner to an undercarriage 14 of the cart 10. The fork 15 which supports the front wheel 12 for rotation therein terminates in a pair of outwardly flaring hand grips 16 of known construction. If desired, a light 17 may be mounted on the fork 15 and may derive it's power from a battery housed in the body of the cart.

The improvement over the known motorized golf carts capable of having two golf bags mounted thereon resides in the manner in which four golf bags may be mounted on the rear portion 18 instead of the usual two golf bags and this is accomplished in the following manner.

Secured to the rear portion 18 of the cart 10 is a vertically extending standard 19 constructed of metal or any other known material. A bracket 20 is secured in any known manner to the rear portion 18 of the cart and secures the standard 19 to the rear portion 18 of the cart 10. Welded or otherwise secured to the vertical standard 19 is a pair of radially extending arms 21, one for the upper portion of the vertical standard and one for the lower portion of the vertical standard. The arms 21 may be formed of a suitable metal or other suitable material and are of hollow construction such as square, rectangular or the like and both the upper and lower arms 21 are identical in structure and semi-circular bag-receiving brackets formed as arcuate support bands 22 are secured in any known manner to telescoping members 23, two such brackets extending outwardly from the outer ends of upper radial arm 21 and a like set of brackets extend outwardly from the outer ends of the lower radial arm 21. Telescoping members 23 are secured in any known manner to the bag-receiving brackets 22 and are designed to telescope within the outer ends of the radial arms 21. Intermediate the outer ends of the radial arms 21 are rearwardly extending brackets 24 which are welded or otherwise secured to the radial arms 21. Rearwardly extending brackets are of hollow construction and may be square, rectangular or the like configuration and are adapted to receive therein the free ends of the telescoping members 23 and openings are formed in the telescoping members 23 and in the radial arms 21 and rearwardly extending brackets 24 and a lock pin 25 extends through the aligned openings to retain the parts in assembled relationship. Tether means 26 such as a chain or the like extend from the pin 25 to the radial arms 21 to prevent loss of the pin.

Secured in any known manner to the brackets 22 extending from the lower radial arm 21 are plate-like members 27 upon which the bottom of a golf bag rests. Straps or the like 28 extend from the brackets 22 which are secured to the upper radial arm 21 and are adapted to encircle the upper portion of a golf bag when the bag is to be mounted on the cart.

Three-wheeled motorized golf carts have a tendency to tip and possibly overturn when rounding a sharp curve, particularly if the cart is driven at an excessive rate of speed. To overcome this situation, the undercarriage 14 is set close to the ground and thus if a cart tends to tip or overturn when rounding a short curve, the undercarriage, which extends well beyond the center line of the front or steering wheel will contact the ground and prevent the cart from further tipping and or overturning thus rendering the cart safer to maneuver particularly around sharp turns or curves.

It is believed the foregoing description conveys a good understanding of the objects and advantages of my invention. While a preferred embodiment of the invention has been illustrated and described, this is only for the purpose illustrated and described, and it is to be understood that various modifications in structure will occur to a person skilled in the art.

I claim:

1. A motorized cart having a vertically disposed rear wall and a golf bag carrier appurtenance therewith, the appurtenance comprising:
   (1) a vertically oriented post supported exteriorly on a central section of said rear wall;
   (2) a pair of tubular arms fixed to each of the top and bottom of the post, extending normal thereto and parallel to the plane of said wall;
   (3) arm extension means removably and telescopically mounted on the free end of each arm;
   (4) further arm means removably and telescopically mounted on an intermediate section of each said tubular arm, extending outwardly therefrom and normal to a vertical plane;
   (5) means for locking the parts in said telescoped disposition;
   (6) an arcuate support band extending outwardly from the end of each of said arm extension means and further arm means;
   (7) each said support band being operatively in vertical alignment with a second of said support bands;
   (8) a horizontally disposed plate extending outwardly from the bottom of each lower support band whereby a golf bag may be supported thereon; and
   (9) strap means associated with each upper arcuate support band whereby a said supported golf bag may be retained within an associated pair of vertically aligned support bands.

* * * * *